United States Patent [19]

Gamo et al.

[11] Patent Number: 4,999,473
[45] Date of Patent: Mar. 12, 1991

[54] AUTOMATIC WIRE THREADING METHOD

[75] Inventors: Gotaro Gamo, Hachioji; Tamotsu Ishibashi, Taito, both of Japan

[73] Assignee: Fanuc Ltd, Minamitsuru, Japan

[21] Appl. No.: 397,419

[22] PCT Filed: Nov. 24, 1988

[86] PCT No.: PCT/JP88/01184
§ 371 Date: Sep. 19, 1989
§ 102(e) Date: Sep. 19, 1989

[87] PCT Pub. No.: WO89/04739
PCT Pub. Date: Jun. 1, 1989

[30] Foreign Application Priority Data

Nov. 26, 1987 [JP] Japan ................. 62-296205

[51] Int. Cl.$^5$ .............................. B23H 7/10
[52] U.S. Cl. ................. 219/69.12; 219/69.17
[58] Field of Search ............. 219/69.12, 69.17, 69.14

[56] References Cited

U.S. PATENT DOCUMENTS

| | | | |
|---|---|---|---|
| 4,544,819 | 10/1985 | Nomura et al. | 219/69.12 |
| 4,547,647 | 10/1985 | Schneider | 219/69.17 |
| 4,698,476 | 10/1987 | Yamamoto et al. | 219/69.12 |
| 4,698,478 | 10/1977 | Girardin | 219/69.12 |
| 4,816,636 | 3/1989 | Obara et al. | 219/69.12 |

FOREIGN PATENT DOCUMENTS

| | | | |
|---|---|---|---|
| 102724 | 6/1982 | Japan | 219/69.12 |
| 149133 | 9/1983 | Japan . | |
| 62-18291 | 4/1987 | Japan . | |
| 62-47135 | 10/1987 | Japan . | |

*Primary Examiner*—Geoffrey S. Evans
*Attorney, Agent, or Firm*—Staas & Halsey

[57] ABSTRACT

An automatic wire threading method for a wire-cut electric discharge machine is provided, which is capable of permitting a wire electrode to pass through a fine-diameter machining start hole using of a simple arrangement. After an upper wire supporting portion on the wire supply side of a wire transportation system is moved, along with a cut wire, toward a workpiece disposed in alignment with the upper wire supporting portion, so that the leading end of the wire is in a machining start hole, the upper wire supporting portion is moved away from the workpiece, while keeping the wire end in the hole, and the wire is then transported to the wire delivery side of the wire transportation system, thus completing wire threading.

8 Claims, 1 Drawing Sheet

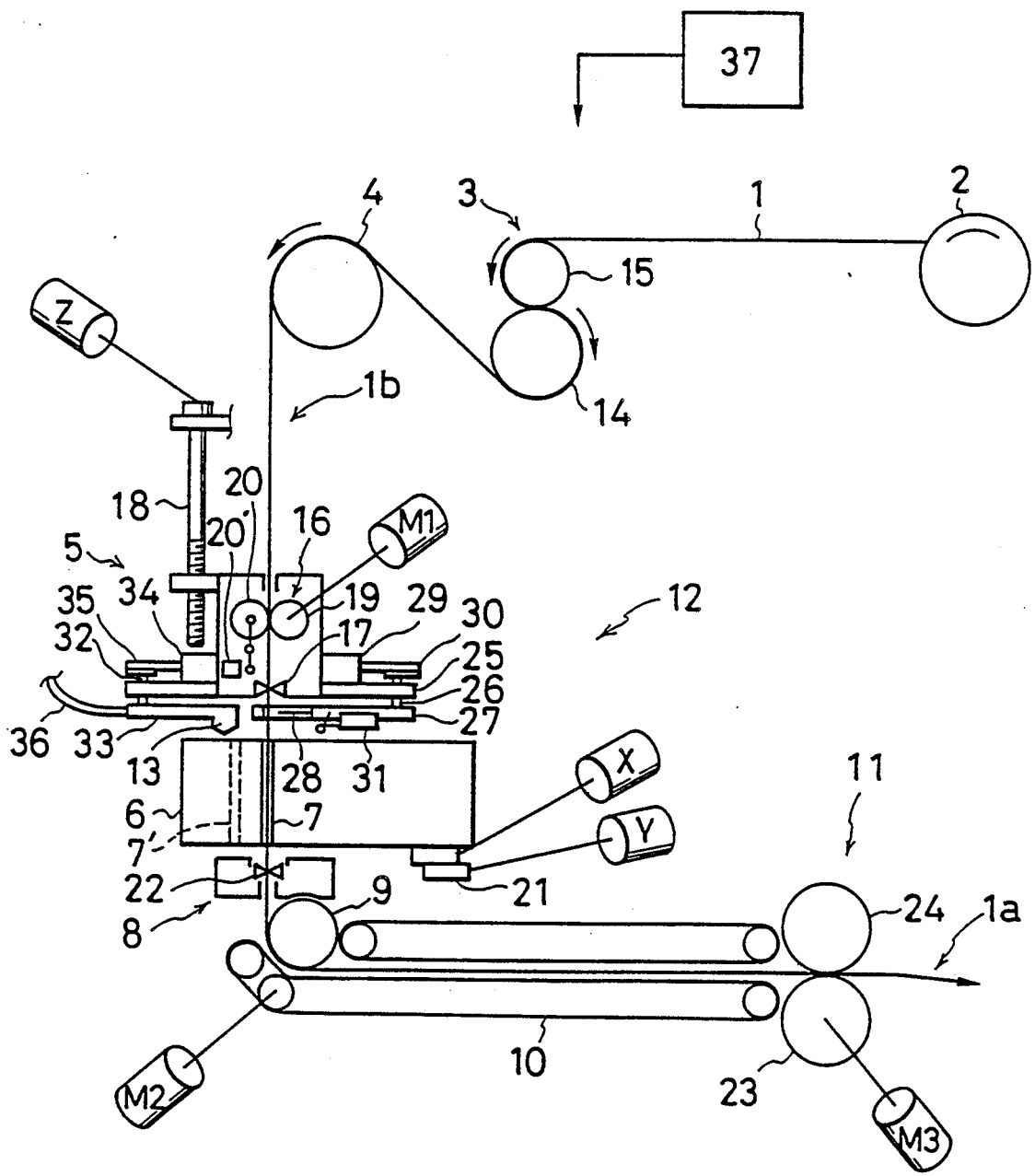

AUTOMATIC WIRE THREADING METHOD

BACKGROUND OF THE INVENTION

The present invention relates to an automatic wire threading method for a wire-cut electric discharge machine, and more particularly, to a method of this type in which a wire electrode (hereinafter referred to as the wire) can be passed through a fine-diameter initial hole for machining using a simple arrangement.

A wire-cut electric discharge machine is provided with a device for automatically connecting a wire, which is artificially cut when one machining cycle is replaced by another or snapped during machining work, while the wire is being transported from the wire supply side of a wire transportation system to the wire delivery side thereof, so that the electric discharge machine is capable of automatic continuous operation. The performance of the electric discharge machine greatly depends on the probability of success in the automatic wire threading.

Conventionally, therefore, various methods and apparatuses for automatic wire threading have been proposed. Meanwhile, in precision machining, an initial hole for machining or a machining start hole, which allows the wire to be passed through a workpiece in the initial stage of the machining, has a very small diameter of, e.g., 0.8 mm or thereabout. In such a case, the probability of success in the automatic wire threading by means of the conventional methods and apparatuses is not always high, and the arrangement is relatively complicated.

An apparatus disclosed in Japanese Patent Disclosure No. 55-164437, for example, is constructed so that a receiving member is introduced beyond a wire guide and a workpiece when the wire is to be cut, and the receiving member is returned after the supply- and delivery-side ends of the wire are coupled by means of the member. This apparatus requires an introducing device for the receiving member and mounting means for connecting the introduced receiving member and the wire.

According to a method and an apparatus disclosed in Japanese Patent Disclosure No. 56-9134, moreover, that portion of a wire which corresponds to an electric discharge machining region is hardened by heating and straightened. After this wire is cut at a position below a workpiece, the straight portion is drawn out temporarily from the workpiece, the workpiece is horizontally moved, and the straight portion is then passed again through a machining start hole. This arrangement, therefore, requires means for ensuring the straightness of the wire.

In a method disclosed in Japanese Patent Disclosure No. 56-52135, moreover, a linear or rod-shaped guide is previously passed through a machining start hole in a workpiece, and the guide and the wire are connected when the wire is passed through another machining start hole. This arrangement requires the trouble of previously passing the guide through each machining start hole. It is difficult to apply this arrangement to automatic wire threading by means of a fine-diameter machining start hole, even though an electrode used for the formation of the machining start hole is employed directly as the guide.

In an apparatus disclosed in Japanese Patent Disclosure No. 56-82133, furthermore, a pipe for guiding a wire is inserted into a machining start hole of a workpiece so that it reaches a lower guide position, at the time of automatic wire threading. It is also difficult to apply this arrangement to the case using a fine-diameter machining start hole.

Further, there is an alternative arrangement in which a narrow water current with a diameter of about 1 to 2 mm is ejected from a sub-nozzle, in intimate contact with a guide, after a wire is cut in the vicinity of a wire supporting portion on the supply side of a wire transportation system, and a wire feed device is driven as the wire is guided to the delivery side by means of the water flow. This arrangement, however, requires a machining start hole greater in diameter than the water flow and a quantity of water large enough to guide the wire. Accordingly, it is difficult to apply this arrangement to automatic wire threading by means of a fine-diameter machining start hole.

SUMMARY OF THE INVENTION

The object of the present invention is to provide an automatic wire threading method in which a wire can be accurately passed through a fine-diameter machining start hole to effect automatic wire threading, using a simple arrangement, in an electric discharge machine.

In order to achieve the above object, an automatic wire threading method of the present invention comprises steps of: (a) cutting a wire in the vicinity of a wire supporting portion provided on a wire supply side of the wire transportation system; (b) sending out that portion of the wire which is left on a wire delivery side of the wire transportation system; (c) aligning a wire passage portion formed in a workpiece with the wire supporting portion at a position directly under the wire supporting portion; (d) moving the wire supporting portion, along with a supply-side portion of the wire, toward the workpiece so that the leading end of the supply-side portion of the wire is situated close to the wire passage portion; (e) moving the wire supporting portion away from the workpiece while keeping the leading end of the supply-side portion of the wire close to the wire passage portion; and (f) transporting the supply-side portion of the wire to the wire delivery side of the wire transportation system, thereby completing wire threading.

According to the automatic wire threading method of the present invention, as described above, the cut wire, along with the wire supporting portion, is lowered so that the leading end of the wire is situated close to the machining start hole, so that the wire can be accurately passed through the machining start hole even though the hole has a very small diameter, and the automatic wire threading can be securely effected. The arrangement is simple, moreover, since the method of the invention can be effected by only adding a mechanism for moving a supply-side wire guide in the Z-axis direction to a conventional automatic wire threading apparatus.

BRIEF DESCRIPTION OF THE DRAWING

The single FIGURE is a schematic view showing the principal part of a wire-cut electric discharge machine to which is applied automatic wire threading according to one embodiment of the present invention.

DETAILED DESCRIPTION OF THE PREFERRED EMBODIMENTS

In the drawing, a wire electric discharge machine is provided with a wire transportation system including an automatic wire threading apparatus. In this transportation system, a wire 1 from a wire supply reel 2 is delivered to an upper guide roller 4 via a wire tension device 3, and is redirected vertically by the roller 4. The wire penetrates an upper wire guide 5 disposed on the wire supply side of the wire transportation system, an initial hole for machining or a machining start hole 7 formed in a workpiece 6, and a lower wire guide 8 disposed on the wire delivery side of the wire transportation system, thus reaching a lower guide roller 9. The wire is redirected by the roller 9, and is then transported toward a wire delivery device 11 by a guide belt 10. Numerals 12 and 13 denote a wire cutting device and a wire guide nozzle, respectively, which are attached to the upper wire guide 5.

The wire tension device 3, which is composed of a brake roller 14 and a pinch roller 15 rotating in contact with the outer peripheral surface of the roller 14, applies a proper tension of the wire 1, resisting the force of wire delivery by the wire delivery device 11.

The upper wire guide 5, which has a wire feed device 16 and an upper wire supporting portion 17 therein, is mounted on an electric discharge machine body (not shown) so as to be vertically movable with respect to the body by means of a Z-axis motor Z and a feed screw mechanism 18. The wire feed device 16 is composed of a feed roller 19 driven by means of a motor M1 and a pinch roller 20 in contact with the outer peripheral surface of the roller 19. The pinch roller 20 is movable toward and away from the feed roller 19 under the control of a solenoid 20.

The workpiece 6 is fixed on a table 21 which is driven by means of an X-axis motor X and a Y-axis motor Y for movement within a horizontal plane.

The lower wire guide 8, which is provided with a lower wire supporting portion 22 opposed to the upper wire supporting portion 17, is fixed in position. The guide belt 10 is operatively connected to a motor M2.

The wire delivery device 11 is composed of a feed roller 23 and a pinch roller 24 which rotates in contact with the outer periphery of the roller 23. The feed roller 23 is operatively connected to a feed motor M3.

The wire cutting device 12 includes an arm 27 which is supported for horizontal rotation by a machine frame 25 integral with the upper wire guide 5, through the medium of a shaft 26. A cutting edge 28 for nipping off the wire 1 is attached to the distal end portion of the arm 27. The arm 27 is operatively connected to an arm rocking solenoid 29 by means of a link mechanism 30, and the cutting edge 28 is connected to a solenoid 31 attached to the arm 27.

As in the case of the wire cutting device 12, the wire guide nozzle 13 is attached to the distal end portion of an arm 33 which is supported for horizontal rotation on the machine frame 25 by means of a shaft 32. The nozzle 13 is arranged to guide the wire 1 so as to nip it sideways, and eject a machining fluid around the wire 1. Numeral 34 denotes a solenoid for rocking the arm 33 by means of a link mechanism 35. Numeral 36 denotes a machining fluid supply hose. The elements 12 and 13 are similar in construction to their counterparts in, for example, a wire processing unit disclosed in International Publication No. W087/01063 under the Patent Cooperation Treaty.

The wire transportation system is provided with a control device 37 having an NC function for the control of the aforesaid various motors and solenoids.

At the time of electric discharge machining, the upper wire guide 5 is in an upper position off the workpiece 6, and the pitch roller 20 of the wire feed device 16 is disengaged from the feed roller 19. Machining is effected by electric discharge which is caused between the wire 1 and the workpiece 6 as the wire 1 is transported from the upper wire supporting portion 17 toward the lower wire supporting portion 22. The wire 1, having passed through the lower wire supporting portion 22, is transported toward the wire delivery device 11 by means of the guide belt 10, and is further forwarded by the feed roller 23 and the pinch roller 24 of the device 11 to be housed in a wire collecting box (not shown). During the electric discharge machining, the wire 1 is forwarded at a constant speed by the feed roller 23.

When cutting from the first machining start hole 7, in the workpiece 6, is finished, the motors M2 and M3 are stopped in response to a command from the control device 37, so that the feed of the wire 1 is stopped. At the same time, electric discharge power between the wire 1 and the workpiece 6 is cut off, and operation for automatic wire threading is then started.

In the operation for automatic wire threading, the solenoid 20' is first actuated in accordance with a command from the control device 37, so that the pinch roller 20 is pressed against the outer peripheral surface of the feed roller 19 to hold the wire 1 therebetween. Then, the solenoid 29 is actuated to rotate the arm 27 between the upper wire guide 5 and the workpiece 6 through the medium of the link mechanism 30, the wire 1 is nipped by means of the cutting edge 28, and the solenoid 31 is then actuated to cut the wire 1. Thus, the wire 1 is cut at a position near and below the upper wire supporting portion 17 which is located on the wire supply side of the wire transportation system.

As the motors M2 and M3 are operated again, the delivery-side portion (hereinafter referred to as the first wire and designated by numeral 1a) of the cut wire 1 is delivered from the wire delivery device 11 into the wire collecting box. At the same time, the arm 27 of the wire cutting device 12 is retreated from a rotating position below the upper wire guide 5 and returns to its original position as the solenoid 29 is de-energized.

The moment the first wire 1 is delivered, the X-axis motor X and the Y-axis motor Y are operated to move the workpiece 6, so that the second machining start hole 7', which is previously formed in the workpiece, is situated directly under the upper wire supporting portion 17.

Then, the feed screw mechanism 18 is driven by means of the Z-axis motor Z, so that the upper wire guide 5 is moved downward. At this time, the supply-side portion (hereinafter referred to as the second wire and designated by numeral 1b) of the cut wire 1, along with the upper wire guide 5, lowers to the region directly over the workpiece 6 in a manner such that it is held between the feed roller 19 and the pinch roller 20, whereupon its leading end is aligned with the second machining start hole 7'. Preferably, in order to increase the probability of success in the automatic wire threading through a fine-diameter hole, the upper wire guide 5 is lowered so that the leading end of the second wire 1b is in the machining start hole 7'.

Subsequently, the feed screw mechanism 18 is driven by means of the Z-axis motor Z to raise the upper wire guide 5. At this time, the wire feed motor M1 delivers the second wire 1b at a feed speed equivalent to the rising speed of the wire guide 5, so that the wire guide 5 rises while keeping the leading end of the wire aligned with the second machining start hole 7' in the position directly over the hole, preferably keeping the wire end in the hole 7'. When the wire guide 5 reaches the upper predetermined position and stops moving, the wire feed motor M1 stops temporarily.

Then, the arm 33 is rocked by the solenoid 34 through the medium of the link mechanism 35, so that the wire guide nozzle 13, integral with the arm 33 and having so far been retreated, is disposed between the raised upper wire guide 5 and the workpiece 6, thus nippingly guiding the wire 1.

Subsequently, the feed roller 19 is driven by means of the wire feed motor M1, so that the second wire 1b, having so far been held between the roller 19 and the pinch roller 20, is delivered. Penetrating the second machining start hole 7' of the workpiece 6, the wire passes the lower wire supporting portion 22 of the lower wire guide 8, and is then transported to the delivery device 11 via the guide belt 10 having already started. Thus, threading of the wire 1 is completed.

Thereupon, the solenoid 20' is de-energized, so that the pinch roller 20 is disengaged from the feed roller 19, thereby freeing the wire 1. Thereafter, normal electric discharge machining is performed such that the wire 1 is drawn out from the wire supply reel 2 and fed at constant speed.

The upper and lower positions of the upper wire guide 5 are set by means of contact-type limit swtiches (not shown) or the control device 37. Moreover, if the wire feed motor M1 continues being rotated, without being temporarily stopped, even when the upper wire guide 5 reaches the upper predetermined position, the wire 1 can be quickly guided by means of the wire guide nozzle 13.

The aforementioned automatic wire threading is effected so that the wire 1 is transferred to the second machining start hole 7'. If the wire 1 snaps at a machining position for the workpiece 6 during the electric discharge machining, it is necessary only that the automatic wire threading be effected through the same procedure as aforesaid, at the position of snapping without moving the workpiece 6, or at a start hole forming position to which the wire 1 is returned to be in alignment with the first machining start hole 7.

The moving means for the upper wire guide 5, the moving means for the pinch roller 20, and the mechanism of the wire cutting device 12 or the wire guide nozzle 13 may be any other alternative means.

When the wire feed device 16 is driven under a condition such that the wire guide nozzle 13 is interposed between the upper wire guide 5 and the workpiece 6, the machining fluid may be ejected from the wire guide nozzle 13 toward the second machining start hole 7', which houses the leading end portion of the second wire 1b, so that the wire 1 is transported to the delivery side with an additional wire guide function of the machining fluid. By doing this, the wire can be passed more smoothly and securely through the fine-diameter machining start hole, so that the probability of success in the automatic wire threading is further increased.

We claim:

1. An automatic wire threading method, consisting of the steps of:
    (a) cutting a wire, extending continuously from a wire supply means, through a first wire passage portion in a workpiece and to a delivery means, in the vicinity of a wire supporting portion provided on a wire supply side of a wire transportation system to create a leading end of the wire left on the supply side of the wire transportation system;
    (b) sending out that portion of said wire which is left on a wire delivery side of said wire transportation system;
    (c) aligning a second wire passage portion formed in the workpiece with said wire supporting portion at a position directly under said wire supporting portion;
    (d) moving said wire supporting portion, along with the supply-side portion of said wire, toward said workpiece so that a leading end of the supply-side portion of said wire is mechanically fed into said second wire passage portion;
    (e) moving said wire supporting portion away from said workpiece while supplying wire so as to keep the leading end of the supply-side portion of said wire in said second wire passage portion; and
    (f) transporting the supply-side portion of said wire to the wire delivery side of said wire transportation system, thereby completing wire threading.

2. An automatic wire threading method according to claim 1, wherein said step (d) includes moving said wire supporting portion and the supply-side portion of said wire so that the leading end of the supply-side portion of said wire is in said second wire passage portion.

3. An automatic wire threading method according to claim 1, herein said second wire passage portion is a machining start hole.

4. An automatic wire threading method according to claim 2, wherein said second wire passage portion is a machining start hole.

5. An automatic wire threading method, consisting of the steps of:
    (a) cutting a wire, extending continuously from a wire supply means, through a first wire passage portion in a workpiece and to a delivery means, in the vicinity of a wire supporting portion provided on a wire supply side of a wire transportation system to create a leading end of the wire left on the supply side of the wire transportation system;
    (b) sending out that portion of said wire which is left on a wire delivery side of said wire transportation system;
    (c) aligning a second wire passage portion formed in the workpiece with said wire supporting portion at a position directly under said wire supporting portion;
    (d) moving said wire supporting portion, along with the supply-side portion of said wire, toward said workpiece so that the leading end of the supply-side portion of said wire is mechanically fed into said second wire passage portion;
    (e) moving said wire supporting portion away from said workpiece while supplying wire so as to keep a leading end of the supply-side portion of said wire in said second wire passage portion;
    (f) guiding the supply-side portion of said wire by means of a wire guide nozzle disposed between said wire supporting portion and said workpiece, said guiding step directly following said step (e); and
    (g) transporting the supply-side portion of said wire to the wire delivery side of said wire transportation system, thereby completing wire threading.

6. An automatic wire threading method according to claim 5, wherein said step (f) includes ejecting a machining fluid from said wire guide nozzle toward said second wire passage portion.

7. An automatic wire threading method according to claim 5, wherein said second wire passage portion is a machining start hole.

8. An automatic wire threading method according to claim 6, wherein said second wire passage portion is a machining start hole.

* * * * *